United States Patent [19]
Klee et al.

[11] Patent Number: 5,130,065
[45] Date of Patent: Jul. 14, 1992

[54] METHOD OF PREPARING POLYACRYLONITRILE HOLLOW THREADS WITH ASYMMETRIC PORE STRUCTURE

[75] Inventors: Rudolf J. Klee; Günter Türck; Wilfried Naunheim; Theo Neukam, all of Dormagen, Fed. Rep. of Germany

[73] Assignee: Bayer Aktiengesellschaft, Leverkusen, Fed. Rep. of Germany

[21] Appl. No.: 670,903

[22] Filed: Mar. 18, 1991

[30] Foreign Application Priority Data

Mar. 28, 1990 [DE] Fed. Rep. of Germany ....... 4009865

[51] Int. Cl.$^5$ .............................................. D01D 5/247
[52] U.S. Cl. ........................................ 264/28; 264/41; 264/558; 264/561; 264/182; 264/206; 264/209.1; 264/150; 264/211; 264/211.15; 264/211.16; 264/233

[58] Field of Search ................... 264/182, 206, 28, 41, 264/558, 561, 209.1, 211.15, 211.16, 233, 150, 211

[56] References Cited

U.S. PATENT DOCUMENTS 3,975,478  8/1976  Leonard ............................... 264/182
4,084,036  4/1978  Leonard ............................... 428/398

FOREIGN PATENT DOCUMENTS 2901860  1/1979  Fed. Rep. of Germany .
0262169  6/1987  Fed. Rep. of Germany .

*Primary Examiner*—Hubert C. Lorin
*Attorney, Agent, or Firm*—Connolly & Hutz

[57] ABSTRACT

The process for production of polyacrylonitrile hollow threads with a stable, asymmetric pore structure by a dry-wet-spinning process with glycerine-based core liquids, definite draw and after treatment conditions and a treatment with alcohols and drying.

9 Claims, No Drawings

METHOD OF PREPARING POLYACRYLONITRILE HOLLOW THREADS WITH ASYMMETRIC PORE STRUCTURE

This invention relates to improved hollow treads of polyacrylonitrile, for use in membranes, (for ultra-and microfiltration) with an asymmetric pore structure of the jacket are characterized in that the polyacrylonitrile is a homo-polymer and in that the pore structure of the wet hollow thread produced immediately after spinning is fixed in a frozen state (by a treatment in the last step with alcohols and drying).

The process for production of the hollow threads with a stable, asymmetric pore structure preferably is a dry-wet-spinning process with glycerin-based core liquids, definite draw and after treatment conditions and (in the last step of fiber preparation) a treatment with alcohols and drying.

The production of asymmetric polyacrylonitrile hollow threads is known, the production of asymmetric PAN (polyacrylonitrile) hollow thread for the desalination of water, the concentration of alcohols and for dialysis in the purification of blood is described in U.S. Pat. No. 4,084,036. Copolymers of 93% ACN (acrylonitrile) and 7% VAC are used for this purpose; the spinning solution is at a concentration of 20% and the polar solvent is dimethylactamide (DMAC). A dry-wet spinning process is used in which the air path between spinning die and precipitation bath is 18 cm and the coagulation bath consists of an aqueous DMAC solution. The core liquid is a glycol solution. The product is washed with water to remove the solvent DMAC. Drying of the hollow threads is to be avoided; they must be kept moist.

The disadvantages of such hollow threads lie inter alia in their insufficient chemical resistance due to the copolymer component, and their unstable polymer structure which prohibits storage of the hollow threads in the dry state. Further, optimum bursting pressure strengths (for a given capillary geometry and structure (porosity)) cannot be achieved when copolymers are sued. The major advantage of polyacrylonitrile polymers in porous capillaries for use as membranes in aqueous media, namely their highly hydrophilic character and wettability, can therefore only be imperfectly realized in industrial applications which use chemically corrosive media. When attempts are made to deal with such chemical stability problems (hydrolysis) by using PAN homopolymers, problems arise in the production of hollow threads. Firstly, insufficiently dissolves polymer particles give rise to weak points in the capillary jacket, and secondly the change in viscosity which takes place in the course of the dwell time of the polymer solution gives rise to a change in pore structure which in turn results in changes in separating limits and permeation rates.

It is and object of the present invention to provide a hollow thread with asymmetric pore structure from polyacrylonitrile homopolymers for use in membranes without any weak points in the jacket, i.e. with high bursting pressure strengths, and with constant separating limits and constant and, moreover, high permeation rates as well as high resistance to acids and bases and a stable pore structure of the jacket in the dry state, and to provide a process for the production of such a hollow thread.

The following solution has been found: Homopolymers of polyacrylonitrile are preferably dissolved completely as described in DE-A-2901860 and the spinning solutions are stabilized by a heat treatment. The spinning solution thus obtained is spun to form a hollow thread by a conventional dry-wet spinning process. The hollow thread is after-treated and washed in known manner the pore structure obtained is then stabilized in a "frozen" state by successively replacing water, core liquid and residual solvent with alcohol, and the alcohol is finally evaporated off. The hollow thread obtained shows surprisingly good separating performance when used in membranes (high flow of permeate for a given separating limit and high bursting pressure for a given capillary geometry). The hollow thread may be stored in a dry, stabilized form and then used in the construction of modules.

The present invention relates to a hollow thread of polyacryonitrile with asymmetric pore structure of the jacket suitable for use in a membranes, characterized in that the polyacrylonitrile is a homopolymer and in that the pore structure produced in the wet hollow thread immediately after spinning is fixed in a "frozen", dry state.

In a preferred embodiment, the invention relates to a hollow thread of polyacrylonitrile with asymmetric pore structure of the jacket whose internal diameter preferably varies form 0.3 to 1.5 mm while the ratio of external diameter DF to internal diameter dF preferably varies from DF/dF=1.1 to DF/dF=1.8.

Further, this hollow thread has good resistance to acids and bases, high bursting pressure strengths with high permeation rates for variably adjustable separating limits of from 1–28000, preferably, 10 to 2800 K-Dalton and a stable pore structure of the jacket in the dry state, and is characterized in that the homopolymer of PAN is used and in that the pore structure of the wet hollow thread produced immediately after spinning is fixed in a "frozen", dry state. The invention further relates to a process for the production of the hollow thread, characterized in that a) the PAN homopolymer is converted into a stable, flawless and low viscosity spinning solution through the polymer being stirred together in the cold state with a suitable solvent such as DMF or DMAC, optionally with the addition of pigments such as $TiO_2$, and homogenised and subsequently pumped through a heater in which it is preferably kept for 3 to 5 minutes at 130 to 150° C., after which it is cooled down to the temperature of the spinning solution used in the spinning process of from 80 to 130° C. before it is spun from a conventional hollow thread die by way of conventional filters and pumps with simultaneous extrusion of a core liquid, and further, in that b) the spun and precipitated hollow thread, which has been subjected to various washing and after-treatment processes is successively freed from core liquid, residual solvent and wash water by replacement with alcohol which is subsequently evaporated off. The process is specifically characterized in the filed claims 5–9.

The polyacrylonitrile is preferably dissolved in accordance with DE-A2 901 860. Spinning is preferably carried out by the dry-wet spinning process.

The "asymmetric pore structure of the jacket" means that the size of the pores continuously increases or decreases over the cross-section of the membrane.

The advantages of capillary membranes of PAN homo- polymer lie in particular in the improved chemical resistance to acids and bases compared with that of capillary membranes of copolymers. Further, the polymer has a better material strength than copolymers. Since in the case of asymmetric, porous hollow thread jackets only slight stretching of the threads is permissible when producing hollow threads (to avoid oval pores) so that the material strengths cannot be improved by stretching, advantages in the strength of the polymer are very welcome. A further advantage of the developed capillary membrane consists in the "frozen" pore structure of the capillary jacket. This ensures that the capillaries can easily be subjected to further working up and that good separating performance (flow of permeate for a given separating limit) can be realized.

Preparation of the hollow according to the invention for use in membranes is preferably carried out as follows:

An acrylonitrile homopolymer is dissolved according to DE-A-2901860. The polymer is first stirred up in a suitable solvent such as DMF or DMAC in the cold, using 18 to 28% of polymer. Pigments such as $TiO_2$ may also be added. The suspension thus obtained is then continuously supplied to a heater where it is heated to a temperature from 130 to 150° C. for a dwell time of 3 to 5 minutes. During this time, the spinning solution develops and becomes uniform. The viscosity is reduced to a stable, low value without significant discolouration, i.e. decomposition of the spinning solution. This spinning solution is then again cooled to the spinning solution temperature used for the spinning process. The spinning solution is delivered to a conventional hollow thread spinning die by way of filters and pumps. Perforated jacket dies in which the perforation has an internal diameter of 0.4 mm are preferably used. The diameter of the inner jacket is 0.6 mm and the diameter of the outer jacket is 1.0 or 1.5 mm. The spinning solution is extruded through the jacket and the core liquid is extruded through the inner perforation. The spinning solution temperatures at the spinning head are from 80 to 130° C. The temperatures of the core solution are normally kept at the same level as those of the spinning solution. The draw-off rate from the spinning die is 5 to 40 m/min, preferably 20 m/min, and the winding speed is from 1.1 to 1.35 times the draw-off rate. A dwell time of 0.1 sec is adjusted between the spinning die and the precipitation bath. Variations in the dwell time from $3 \times 10^{-3}$ to 0.4 sec showed no significant effect on the properties of the hollow thread. The volume streams of the spinning solutions and core solution are adjusted so that the desired geometries of the hollow threads are obtained. The diameter of the internal perforation dF is form 0.3 to 1.5 mm, preferably from 0.8 to 1.2 mm. The external diameter DF of the hollow thread is adjusted so that the ratio DF/dF is about 1.2 in a thin walled hollow thread and about 1.6 in a thick walled hollow thread. After their transport through the air path between die and precipitation bath, the hollow threads are precipitated in a coagulation bath in which aqueous DMF or DMAC solutions and pure water are normally used. The temperature of the precipitation bath is varied from 0 to 60° C., preferably 0–40° C. The precipitation conditions influence the porosity of the jacket. The temperature of the precipitation bath is preferably 0–40° C. for smaller Dalton values (1–100) and the higher temperatures (5–40° C.) are preferred for the higher Dalton values (e.g. 1–2800K Dalton). The more preferred values of precipitation bath temperatures for small Dalton values (1–10 K Dalton) are ice water to 30° C.; and 5–25° C. for higher Dalton values. The core liquids used are diols or triols, preferred core liquid are glycerol, glycerol/water mixtures, glycerol/solvent mixtures and water. The separating limit is determined to a considerable extent by the composition of the core liquid. The permeation rate depends on the separating limit and on the pore structure of the jacket. The passage through the precipitation bath is followed by a passage through various washing and after-treatment baths. At least one of these baths must be at a temperature of at least 80° C., preferably 100° C., if stable hollow threads are to be obtained in the drying process. The stretching carried out in the after-treatment is less than or equal to 1.35 in order that the bursting pressure strengths obtained may be as high as possible. After the washing and after-treatment processes, the hollow thread is wound on a reel whose length of edge is calculated to produce the desired length of capillaries without weak points at kinks in the subsequent construction of modules. The strand of hollow thread is kept moist during the winding process. The hollow thread strand comprising, for example, 100 capillaries is subjected to a further after-treatment to stabilize the pore structure of the jacket of the hollow thread. In this after-treatment, water and core liquid are removed by replacement with an alcohol, e.g. ethanol, and the alcohol may subsequently evaporate off. A dry hollow thread with "frozen" pore structure in the capillary jacket is obtained for the construction of modules.

Various parameters must be known for assessing the properties of the hollow thread for use in membranes.

The geometry of the hollow thread is determined by freeze breakages with automatic apparatus for measuring surfaces, e.g. Omnicon. The bursting pressure is determined on individual capillaries 15 cm in length specially cast into screw fittings. The bursting pressure in bar may be determined in the wet state by applying a water pressure to the inside of a hollow thread capable of recording pressure.

The permeation rate of deionised water (the so-called water value) is determined on test modules. A stream of water is pumped through the capillary of the test module at a pressure difference between internal and external wall of 3 (6) bar so that an overflow rate of 2 m/min is obtained. The water passing through the capillary form the inside to the outside is measured and the permeate stream of deionised water is calculated in $1/m^2 \times h \times bar$.

The separating limits are determined with the same experimental arrangement as that used for determining the water value but in this case a 1% dextran solution of variable molecular size is used instead of water.

The molecular sizes vary from 1 to 2800 K-Dalton, preferably from 10 K-Dalton to 2000 K-Dalton. The quantity and concentration of the permeate leaving at the outside are measured. The retention, i.e. the original concentration of the solution minus the permeate concentration, based on the original concentration in present, is calculated as the retention value R. The retention of various types of dextran solution is plotted on a graph against the logarithm of the molecular sizes of the dextran used and the separating limit for a retention of R=90% is found by extrapolation.

The flow of permeate under conditions occurring in practice is determined by measuring the flow of permeate at R values >80%. The specific permeate flow based on the surface area of the internal diameter is calculated in $1/m^2 \times h \times bar$ and stated as permeate flow with R>80%.

In addition to the permeate flow with R>80% it is in some cases of intersect to find the specific permeate flow for separating effects R<30%. This specific permeate flow for R<30% is close to the water vale if it is determined on hollow threads which have not yet been used.

Preferred embodiments of the hollow threads according to the invention are described below.

a) Separating limit from 30 to 50 K-Dalton (for 90% retention measured with dextrans) and a specific permeation rate of 4 to 6 $1/m^2 \times h \times bar$ in 1% dextran solutions which are retained by more than 80%; bursting pressure 21 bar, DF/dF=1.2,dF=1 mm.

b) Separating limit from 50 to 80 K-Dalton and a specific permeation rate of 10 to 17 $1/m^2 \times h \times bar$ for a retention of R>80%; bursting pressure 13 bar, dF=1 mm, DF/dFA=1.2.

c) Separating limit from 400 to 2800 K-Dalton with water permeation rates of 30 to 140 $1/m^2 \times h \times bar$; DF/dF about 1.2, dF about 1 mm, bursting pressure about 14 bar.

Preferred embodiments of the process are described below.

d) Spinning solution concentration 18% to 28%, preferred values 20–28% e) A process in which the core liquid consists of glycerol/water in the ratio of 60:40 to 60–60, preferably 1:1, or of pure glycerol.

f) distance spinning die to precipitation bath is 2–30 cm, preferably 20–25 mm, g) residence time in the air gap between die and precipitation bath is preferably between $3.10^{-3}$ to 0,3 sec.

h) the ratio between winding speed to spinning speed at the die is 1.1–1.35 i) volume streams of core liquid/polymer solutions is preferably 0.8:1 to 1.2:1, more preferably 0.8:1 to 1.1:1, j) the winding speed is 6–40 m/min, k) the volume streams core liquid/polymer solution (at a given spinning speed) are regulated in such a way, that the inner hole diameter dF=0,8-1,2 mm and the ratio DF/dF is 1.1-1.8.

EXAMPLE 1

A PAN suspension of 20% PAN homopolymer in DMF (dimethylformamide) is heated to 140° C. for 5 minutes and then cooled to 96° C. and spun through a spinning die having an external jacket diameter of 1.0 mm and an internal jacket diameter of 0.6 mm. The diameter of the inner perforation for the outlet of the core liquid is 0.4 mm. The core liquid used is glycol. The temperature of the glycerol is also 96° C. The air gap between the die and the precipitation bath is 23 mm, the draw-off rate from the spinning die 14 m/min and the winding rate 16.2 m/min. The volumetric stream of the polymer solution is 13.7 ml/min and the volumetric steam of the core liquid is 11.5 ml/min. The first precipitation bath consists of water at a temperature of 6° C. The second bath is also water; its temperature is about 25° C. The third bath also consists of water. It is traversed 13 times at a water temperature of 60° C. The fourth bath is water at the boiling point. After leaving the fourth bath, the hollow thread is wound on to a reel having a length of shank of 85 cm for every 100 hollow threads. The hollow threads are kept moist during the winding process.

The bundle of hollow threads is then removed from the reel, cut up into pieces 80 cm in length, freed from water adhering to it and from escaping core liquid and is then after-treated twice in ethanol solutions, each time for 15 minutes. The hollow threads are then removed from the alcohol solutions and dried by evaporation of the remaining alcohol.

Capillaries 80 cm in length are obtained which have an internal diameter of dF=1.02 mm, an external/internal diameter ratio of DF/dF=1.2, a bursting pressure of 13 bar, a separating limit of 60 to 70 K-Dalton for R=90% and a specific permeation rate for R>80% of 11 to 16 $1/m^2 \times h \times bar$. The water value 8 is about 20 $lm^2 \times h \times bar$.

EXAMPLE 2

Comparable capillary geometries are obtained with experiments carried out under the same conditions as in the first example but with a polymer concentration of 28%. The bursting pressure in this case is 21 bar, the specific permeation rate for R >80% drops to 4 to 6 $1/m^2 \times h \times bar$ and the separating limit is about 40 K-Dalton.

EXAMPLE 3

Comparable capillary geometries and bursting pressure strengths are still obtained in experiments carried out under conditions comparable to those of the first example but with a quantity of $TiO_2$ amounting to 20%, based on PAN, and a core liquid of glycerol/water in the ratio of 1:1. The separating limit, however, shifts drastically to 1100 K-Dalton. The specific permeate flow for R>80% is 17 $ls/nm^2 \times h \times bar$ and the water value rises to above 50 $1/m^2 \times h \times bar$.

EXAMPLE 4

Under the experimental conditions of example 1), however with the precipitation bath temperature of 0° C. (ice water), comparable capillary geometries are obtained. The bursting pressure remains to be 13 bar; the specific permeation rate for R>80% is lowered to 0.9 $liter/m^2.h.bar$, and the separating limit is about 9 K-Dalton.

EXAMPLE 5

Under the experimental conditions of example 1) but with a polymer concentration of 28% and a precipitation temperature of 0° C., comparable capillary geometries are obtained. The specific permeation rate for R>80% is lowered to 0,2 $lm^2.h.bar$, the separating limit is now 2-K-Dalton.

We claim:

1. In a process for preparing hollow threads of polyacrylonitrile with asymmetric pore structure suitable for use in membranes, wherein the polyacrylonitrile is a polyacrylonitrile homopolymer which contains 0–35% $TiO_2$ and having the originally spun pore structure of the wet hollow thread fixed in a dry state with the internal diameter of 0.3 to 1.5 mm, a ratio of external diameter to internal diameter from 1.1 to 1.8 and the separating limit from 1 to 2800 K-Dalton, which comprises converging polyacrylonitrile homopolymer into a stable, flawless, low-viscosity spinning solution by dissolving the polymer in the cold state in a solvent with or without $TiO_2$ pigment, homogenizing the solution, heating the solution to 130–150° C., cooling the solution to 80–130° C., spinning the solution through a hollow thread die with concomitant extrusion of a core liquid to produce a hollow thread, the improvement comprises subjecting the hollow thread to washing and aftertreatment and, thereafter, freeing the hollow thread from core liquid, residual solvent and wash water by exchange with alcohol followed by evaporation of the alcohol to dry the thread.

2. The process according to claim 1 wherein the alcohol is ethanol.

3. The process according to claim 1 wherein after spinning, strands of the hollow thread which contains core liquid are deposited wet and kept wet on a reel, said strands are cut open at points of contact on the reel whereby the core liquid and water adhering to the strands will drain off, whereafter any remaining water and core liquid is removed by immersion in at least one alcohol bath and the alcohol is subsequentially removed by evaporative drying.

4. The process according to claim 1 wherein the spinning solution concentration of polyacrylonitrile homopolymer is 18-28%, the spinning solvent is dimethylformamide, the core liquid is glycerol or aqueous glycerol, the temperature of the spinning solution and the core liquid is 80-100° C., the draw-off rate from the spinning die is 6-40 meters/minute and the volumetric ratio so core liquid to polymer solution through the die is 0.8:1 to 1.2:1, subjecting the spun hollow thread to a precipitation bath after exit from the spinning die with the distance between the spinning die and the precipitation bath being 2-20 mm, a residence time between the die and the precipitation bath of form $3 \times 10^{-3}$ to 0.4 seconds, the precipitation bath being a liquid selected from the group consisting of water, aqueous dimethylformamide and aqueous dimethylactamide at a temperature of 0-60° C., then subjecting the thread to a plurality of water baths at sequentially higher temperatures with one at a temperature of 20 to 30° C., another at a temperature of 50 to 70° C. and another at a temperature of 80 to 100° C., then winding the thread at a winding rate of 1.1 to 1.35 times the draw off rate of the spinning die, and freeing the hollow thread from core liquid, residual solvent and wash water by exchange with alcohol followed by evaporation of the alcohol to dry the thread.

5. The process according to claim 4 wherein the volume of core liquid and the volume of polymer solution passing through the spinning die are adjusted whereby the hollow thread spun has an internal diameter of 0.8 to 1.2 mm with a ratio of external diameter to internal diameter of 1.1 to 1.8.

6. The process according to claim 4 wherein the winding rate is 1.6 to 1.35 times the draw off rate, the ratio of volume of core liquid to polymer solution is 0.8 to 1.1, and the hollow thread has a internal diameter of 0.8 to 1.2 mm with a ratio of external diameter to internal diameter of 1.1 to 1.8.

7. The process according to claim 4 wherein the temperature of the precipitation bath is 0-40° C.

8. The process according claim 4 wherein the temperature of the precipitation bath is 5-25° C.

9. The process according to claim 4 wherein the temperature of the precipitation bath is 5-25° C.

* * * * *